United States Patent
Kerth et al.

(10) Patent No.: US 10,260,820 B2
(45) Date of Patent: Apr. 16, 2019

(54) PUMPED HEAT ENERGY STORAGE SYSTEM USING A CONVEYABLE SOLID THERMAL STORAGE MEDIA

(71) Applicant: DRESSER-RAND COMPANY, Olean, NY (US)

(72) Inventors: Jason M. Kerth, Houston, TX (US); Joseph T. Williams, Kirkland, WA (US)

(73) Assignee: DRESSER-RAND COMPANY, Olean, NY (US)

( * ) Notice: Subject to any disclaimer, the term of this patent is extended or adjusted under 35 U.S.C. 154(b) by 1 day.

(21) Appl. No.: 15/604,796

(22) Filed: May 25, 2017

(65) Prior Publication Data

US 2017/0350658 A1 Dec. 7, 2017

Related U.S. Application Data (60) Provisional application No. 62/346,592, filed on Jun. 7, 2016.

(51) Int. Cl.

| | |
|---|---|
| *F02C 1/00* | (2006.01) |
| *F28D 17/00* | (2006.01) |
| *F28D 17/04* | (2006.01) |
| *F28D 20/00* | (2006.01) |
| *H02K 7/18* | (2006.01) |

(Continued)

(52) U.S. Cl.
CPC .............. *F28D 17/005* (2013.01); *F02C 1/10* (2013.01); *F02C 6/14* (2013.01); *F28D 17/04* (2013.01); *F28D 20/00* (2013.01); *H02K 7/1823* (2013.01); *F05D 2260/213* (2013.01); *F28D 2020/0069* (2013.01); *F28D 2020/0078* (2013.01); *F28D 2020/0082* (2013.01); *Y02E 60/142* (2013.01)

(58) Field of Classification Search
CPC ...... F28D 20/00; F28D 20/0078; F28D 17/04; F28D 20/0082; F05D 2260/213; F02C 6/14; F02C 1/10
USPC .............................. 290/52; 60/659, 650, 652
See application file for complete search history.

(56) References Cited

U.S. PATENT DOCUMENTS 4,033,135 A * 7/1977 Mandrin ................. F01K 23/02
  60/618
4,593,202 A * 6/1986 Dickinson ............... F01K 3/188
  290/43

(Continued)

FOREIGN PATENT DOCUMENTS

| EP | 2687702 A1 | 1/2014 |
|---|---|---|
| GB | 2516453 A | 1/2015 |

(Continued)

*Primary Examiner* — Julio C. González (57) ABSTRACT

A pumped heat energy storage system is provided. The pumped heat energy storage system may include a charging assembly configured to compress a working fluid and generate thermal energy. The pumped heat energy storage system may also include a thermal storage assembly operably coupled with the charging assembly and configured to store the thermal energy generated from the charging assembly. The pumped heat energy storage system may further include a discharging assembly operably coupled with the thermal storage assembly and configured to extract the thermal energy from the thermal storage assembly and convert the thermal energy to electrical energy.

12 Claims, 3 Drawing Sheets

(51) Int. Cl.
*F02C 1/10* (2006.01)
*F02C 6/14* (2006.01)

(56) References Cited

U.S. PATENT DOCUMENTS

| | | | |
|---|---|---|---|
| 7,971,424 B2 * | 7/2011 | Masada | F01K 9/003 60/39.182 |
| 9,938,896 B2 * | 4/2018 | Bannari | F01D 15/02 |
| 2009/0165456 A1 * | 7/2009 | Masada | F01K 9/003 60/531 |
| 2011/0100010 A1 * | 5/2011 | Freund | F02C 1/005 60/659 |
| 2013/0139509 A1 * | 6/2013 | Berti | F01K 25/103 60/648 |
| 2015/0143828 A1 * | 5/2015 | Atalla | F01K 7/22 62/115 |
| 2015/0218969 A1 * | 8/2015 | Reznik | F01K 1/08 60/651 |
| 2015/0260463 A1 | 9/2015 | Laughlin et al. | |
| 2017/0321967 A1 * | 11/2017 | Laughlin | F02C 1/10 |
| 2018/0179960 A1 * | 6/2018 | Apte | F02C 9/16 |

FOREIGN PATENT DOCUMENTS

| | | |
|---|---|---|
| GB | 2528449 A | 1/2016 |
| WO | 2011053411 A1 | 5/2011 |

\* cited by examiner

PUMPED HEAT ENERGY STORAGE SYSTEM USING A CONVEYABLE SOLID THERMAL STORAGE MEDIA

CROSS-REFERENCE TO RELATED APPLICATIONS

This application claims the benefit of U.S. Provisional Patent Application Ser. No. 62/346,592, which was filed Jun. 7, 2016. The aforementioned patent application is hereby incorporated by reference in its entirety into the present application to the extent consistent with the present application.

BACKGROUND

Pumped Heat Energy Storage (PHES) systems store excess power from an electrical grid during periods of excess electricity and generate electricity to upload to the electrical grid during high demand periods. Generally, PHES systems store the excess power in the form of heat or thermal energy, and subsequently generate electricity from the stored heat energy. In a PHES system, a motor may utilize electrical energy to drive a heat pump cycle. The heat pump cycle may move thermal energy from a cold reservoir to a hot reservoir to thereby store the thermal energy. When desired, a heat engine cycle may be utilized to extract and convert the stored thermal energy to produce mechanical energy, which may be utilized to generate electricity.

Operational efficiencies of the PHES system may be determined, at least in part, by a ratio of mechanical work or energy generated to the thermal energy stored. While the operational efficiencies of the PHES system may be improved by increasing the efficiencies of equipment and machines used to operate the heat pump cycle and the heat engine cycle, the equipment and machines needed to achieve the increased efficiencies are generally cost-prohibitive. For example, in a conventional PHES system, a working fluid directly contacts a stationary mass of the thermal storage media to store the thermal energy. Due to the direct contact between the stationary mass, the entire volume of the thermal storage media must be pressurized to a pressure of the working fluid. Accordingly, when the PHES system is operated at a relatively high base pressure, more robust and cost-prohibitive storage tanks must be utilized.

What is needed, then, is an improved PHES system and method for storing and generating electricity.

SUMMARY

Embodiments of the disclosure may provide a pumped heat energy storage system. The pumped heat energy storage system may include a charging assembly configured to compress a working fluid and generate thermal energy. The pumped heat energy storage system may also include a thermal storage assembly operably coupled with the charging assembly and configured to store the thermal energy generated from the charging assembly. The pumped heat energy storage system may further include a discharging assembly operably coupled with the thermal storage assembly and configured to extract the thermal energy from the thermal storage assembly and convert the thermal energy to electrical energy.

Embodiments of the disclosure may further provide a pumped heat energy storage system. The pumped heat energy storage system may include a charging assembly configured to generate thermal energy. The charging assembly may include a first compressor configured to compress a working fluid to generate the thermal energy, a first turbine operably coupled with the first compressor, and a motor coupled with the first compressor and configured to drive the first compressor. The pumped heat energy storage system may also include a thermal storage assembly operably coupled with the charging assembly and configured to store the thermal energy generated from the charging assembly. The pumped heat energy storage system may further include a discharging assembly operably coupled with the thermal storage assembly and configured to extract the thermal energy from the thermal storage assembly and convert the thermal energy to electrical energy. The discharging assembly may include a second compressor configured to compress the working fluid from the thermal storage assembly, and a second turbine operably coupled with the second compressor and configured to expand the working fluid from the thermal storage assembly to generate mechanical energy. The discharging assembly may also include a generator operably coupled with the second turbine and configured to convert at least a portion of the mechanical energy to the electrical energy.

Embodiments of the disclosure may further provide a pumped heat energy storage system. The pumped heat energy storage system may include a thermal storage assembly configured to store thermal energy. The thermal storage assembly may include a first media tank configured to store particulate media at ambient temperature, a second media tank fluidly coupled with the first media tank and configured to store a heated particulate media, and a third media tank fluidly coupled with the first media tank and configured to store a cooled particulate media. The thermal energy storage assembly may also include a first heat exchanger coupled with an inlet of the second media tank, a second heat exchanger coupled with an inlet of the third media tank, and a third heat exchanger coupled with a first inlet of the first media tank. The thermal energy storage assembly may further include a fourth heat exchanger coupled with a second inlet of the first media tank. Each of the first, second, third, and fourth heat exchangers may be an indirect solid-gas heat exchanger. The pumped heat energy storage system may also include a charging assembly configured to compress a working fluid and generate the thermal energy stored in the thermal storage assembly. The charging assembly may include a first compressor fluidly coupled with and disposed upstream of the first heat exchanger and downstream of the second heat exchanger, the first compressor being configured to compress the working fluid and generate the thermal energy. The charging assembly may also include a first turbine fluidly coupled with and disposed downstream from the first heat exchanger and upstream of the second heat exchanger. The charging assembly may further include a motor coupled with the first compressor and configured to drive the first compressor. The pumped heat energy storage system may further include a discharging assembly configured to extract the thermal energy stored in the thermal storage assembly and convert the thermal energy to electrical energy. The discharging assembly may include a second compressor fluidly coupled with and disposed downstream from the fourth heat exchanger and upstream of the third heat exchanger, the second compressor being configured to compress the working fluid from the fourth heat exchanger. The discharge assembly may also include a second turbine fluidly coupled with and disposed downstream from the third heat exchanger and upstream of the fourth heat exchanger, the second turbine configured to expand the working fluid from the third heat exchanger to generate mechanical energy. The discharge assembly may further include a generator operably coupled with the second turbine and configured to convert at least a portion of the mechanical energy to the electrical energy.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
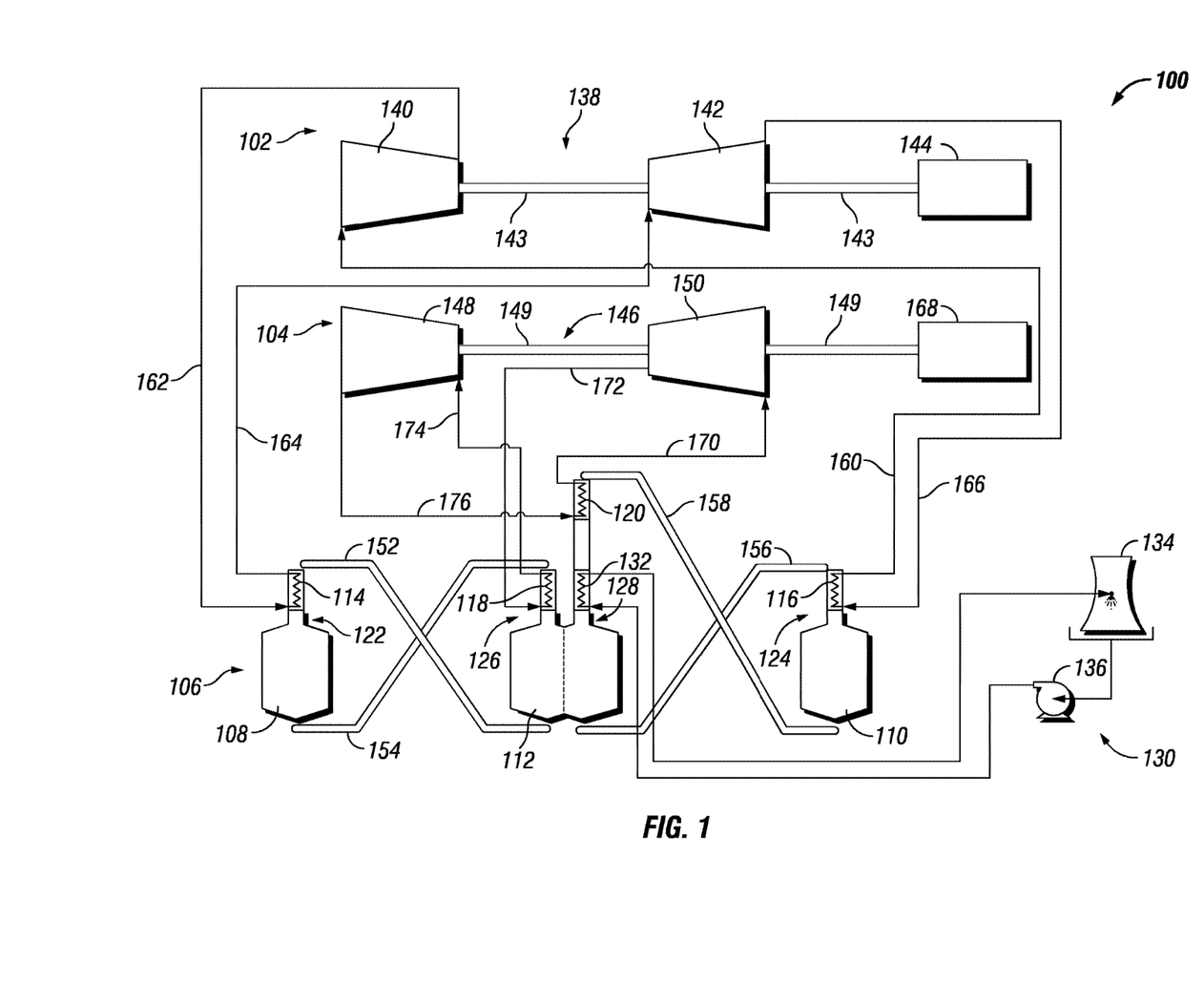
FIG. 1 illustrates a process flow diagram of an exemplary pumped heat energy storage (PHES) system, accordingly to one or more embodiments disclosed.

FIG. 1 illustrates a process flow diagram of an exemplary pumped heat energy storage (PHES) system 100, accordingly to one or more embodiments. The PHES system 100 may include a charging assembly 102, a discharging assembly 104, and a thermal storage assembly 106 operably coupled with and/or in thermal communication with one another. As further described herein, the PHES system 100 may be configured to circulate a working fluid (e.g., argon) through at least a portion of the charging assembly 102 to generate heat or thermal energy, store the thermal energy in at least a portion of the thermal storage assembly 106, extract the thermal energy from the thermal storage assembly 106, and convert the thermal energy from the thermal storage assembly 106 to electrical energy in the discharging assembly 104.

The thermal storage assembly 106 may include one or more media vessels or tanks (three are shown 108, 110, 112) configured to contain and store particulate media. For example, the thermal storage assembly 106 may include a hot media tank 108 configured to contain and store particulate media at a temperature not greater than 1200° F., a cold media tank 110 configured to contain and store particulate media at a temperature not less than −200° F., and a dead or ambient media tank 112. As illustrated in FIG. 1, the hot media tank 108 may be fluidly coupled with and disposed downstream from the ambient media tank 112 via conveyor or line 152. The hot media tank 108 may also be fluidly coupled with and disposed upstream of the ambient media tank 112 via conveyor or line 154. The cold media tank 110 may be fluidly coupled with and disposed downstream from the ambient media tank 112 via conveyor or line 156 and upstream of the ambient media tank 112 via conveyor or line 158. The particulate media may be circulated through the thermal storage assembly 106 via the conveyors or lines 152, 154, 156, 158. For example, as further described herein, the particulate media may be transferred between two or more of the tanks 108, 110, 112 via the conveyors or lines 152, 154, 156, 158. In one or more embodiments, the particulate media may be transferred between two or more of the tanks 108, 110, 112 via gravity. For example, one or more of the tanks 108, 110, 112 may be disposed at a higher elevation than another one of the tanks 108, 110, 112, thereby resulting in a gravity-driven transference of the particulate media via one or more of lines 152, 154, 156, 158. While the thermal storage assembly 106 illustrated in FIG. 1 includes three media tanks 108, 110, 112, it should be appreciated that the thermal storage assembly 106 may include any number of media tanks including any combination of hot, cold, and ambient media tanks. For example, as illustrated in phantom in FIG. 1, the thermal storage assembly 106 may include two or more ambient media tanks, where a first ambient media tank may be fluidly coupled with the hot media tank 108, a second ambient media tank may be fluidly coupled with the cold media tank 110, and the first and second ambient media tanks are not in fluid communication with one another.

The thermal storage assembly 106 may also include one or more heat exchangers (four are shown 114, 116, 118, 120) operably coupled with one or more of the media tanks 108, 110, 112, and configured to heat or cool the particulate media directed to each of the media tanks 108, 110, 112. For example, a first heat exchanger 114 may be operably coupled with an inlet 122 of the hot media tank 108 and configured to heat the particulate media directed thereto. A second heat exchanger 116 may be operably coupled with an inlet 124 of the cold media tank 110 and configured to cool the particulate media directed thereto. A third heat exchanger 118 may be operably coupled with a first inlet 126 of the ambient media tank 112 and configured to cool the particulate media directed thereto. A fourth heat exchanger 120 may be operably coupled with a second inlet 128 of the ambient media tank 112 and configured to heat the particulate media directed thereto.

The heat exchangers 114, 116, 118, 120 may be or include any device capable of at least partially transferring thermal energy between the working fluid and the particulate media. In at least one embodiment, each of the heat exchangers 114, 116, 118, 120 may be a solid-gas heat exchanger configured to transfer thermal energy between the working fluid (e.g., the gas) and the particulate media (e.g., the solid). For example, each of the heat exchangers 114, 116, 118, 120 may be solid-gas heat exchangers configured to transfer thermal energy between particulate media contained in the thermal storage assembly 106 and the working fluid flowing through the charging assembly 102 and/or the discharging assembly 104. In an exemplary embodiment, the solid-gas heat exchangers 114, 116, 118, 120 may be configured to indirectly transfer thermal energy between the working fluid and the particulate media. Accordingly, the working fluid and the particulate media in the PHES system 100 may not directly contact one another to transfer thermal energy therebetween. Additionally, each of the charging assembly 102, the discharging assembly 104, and the thermal storage assembly 106 may be referred to as closed cycles or circuits. Further, a pressure of the working fluid contained in the charging assembly 102 and/or the discharging assembly 104 may be different than a pressure of the thermal storage assembly 106.

The particulate media circulated through the thermal storage assembly 106 may be or include any material capable of transferring and receiving thermal energy to and from the working fluid via the heat exchangers 114, 116, 118, 120. For example, the particulate media may be or include one or more solid particles and/or fibers suitable for indirectly transferring thermal energy with the working fluid via one or more of the heat exchangers 114, 116, 118, 120. The particulate media may also be or include refractory materials suitable for indirectly transferring thermal energy with the working fluid via one or more of the heat exchangers 114, 116, 118, 120. In at least one embodiment, the particulate media may have a low thermal inertia. For example, the particulate media may be or include a metallic material (e.g., metal filings). In another embodiment, the particulate media may be or include a mineral or ceramic (e.g., silica, ceramics, etc.). As previously discussed, the thermal storage assembly 106 may include two or more ambient media tanks. In such an embodiment, each of the two or more ambient media tanks may contain the same or different particulate media.

The PHES system 100 may also include a heat rejection system 130 operably and thermally coupled with the thermal storage assembly 106. The heat rejection system 130 may include a heat exchanger 132, a cooling unit, such as a cooling tower 134, and/or a pump 136 operably and fluidly coupled with one another. For example, as illustrated in FIG. 1, the heat exchanger 132 may be operably and fluidly coupled with and disposed downstream of the pump 136 and upstream of the cooling tower 134. As further illustrated in FIG. 1, the cooling tower 134 may be operably and fluidly coupled with and disposed downstream from the heat exchanger 132 and upstream of the pump 136. In addition to or in place of the cooling tower 134, the cooling unit may be or include once-through cooling utilizing sea or fresh water, a water-to-air heat exchanger, a water-to-water heat exchanger, where the secondary coolant is sea or fresh water, or air cooling utilizing a blower to flow atmospheric air through the heat exchanger 132. The heat rejection system 130 may be configured to extract or remove thermal energy from one or more portions of the PHES system 100. For example, the heat exchanger 132 of the heat rejection system 130 may be thermally coupled with one or more portions of the PHES system 100 (e.g., the thermal storage assembly 106) and configured to remove thermal energy therefrom. As illustrated in FIG. 1, the heat exchanger 132 of the heat rejection system 130 may be thermally coupled with the second inlet 128 of the ambient media tank 112 and configured to remove thermal energy from the particulate media flowing thereto.

As illustrated in FIG. 1, the charging assembly 102 may include a turbomachinery assembly 138 configured to compress and expand the working fluid flowing therethrough. The turbomachinery assembly 138 may include one or more compressors (one is shown 140), one or more expanders or turbines (one is shown 142), and/or a motor 144 operably coupled with one another. For example, as illustrated in FIG. 1, the compressor 140, the turbine 142, and the motor 144 may be coupled with one another via a common rotary shaft 143.

As further illustrated in FIG. 1, the compressor 140 may be fluidly coupled with and disposed downstream from the second heat exchanger 116 of the thermal storage assembly 106 via line 160. The compressor 140 may also be fluidly coupled with and disposed upstream of the first heat exchanger 114 of the thermal storage assembly 106 via line 162. The compressor 140 may be configured to receive the working fluid from the second heat exchanger 116 via line 160, compress the working fluid, and direct the compressed working fluid to the first heat exchanger 114 via line 162. As further described herein, the compressor 140 may be configured to utilize mechanical energy from the turbine 142 and/or the motor 144 to compress the working fluid flowing therethrough to increase the pressure and thermal energy or heat (e.g., heat of compression) of the working fluid.

The turbine 142 may be fluidly coupled with and disposed downstream from the first heat exchanger 114 of the thermal storage assembly 106 via line 164, and may further be fluidly coupled with and disposed upstream of the second heat exchanger 116 of the thermal storage assembly 106 via line 166. The turbine 142 may be configured to receive the working fluid from the first heat exchanger 114 via line 164, expand the working fluid, and direct the expanded working fluid to the second heat exchanger 116 via line 166. The expansion of the working fluid through the turbine 142 may produce mechanical energy. For example, the turbine 142 may be configured to convert a pressure drop from the expansion of the working fluid to mechanical energy. At least a portion of the mechanical energy produced by the turbine 142 may be utilized to drive the compressor 140.

The discharging assembly 104 may include another turbomachinery assembly 146 configured to compress and expand the working fluid flowing therethrough. The turbomachinery assembly 146 may include one or more expanders or turbines (one is shown 148), one or more compressors (one is shown 150), and/or a generator 168 operably coupled with one another. For example, the compressor 150, the turbine 148, and the generator 168 may be coupled with one another via a common rotary shaft 149. In another example, the turbine 148 and the compressor 150 may be coupled with one another via a first drive shaft (not shown) and the turbine 148 and the generator 168 may be coupled with one another via a second drive shaft (not shown). In another example, the turbomachinery assembly 146 may be an integrally geared unit.

The compressor 150 may be fluidly coupled with and disposed downstream from the fourth heat exchanger 120 of the thermal storage assembly via line 170. The compressor 150 may also be fluidly coupled with and disposed upstream of the third heat exchanger 118 of the thermal storage assembly 106 via line 172. The compressor 150 may be configured to receive the working fluid from the fourth heat exchanger 120 via line 170, compress the working fluid, and direct the compressed working fluid to the third heat exchanger 118 via line 172. As further described herein, the compressor 150 may be configured to utilize mechanical energy from the turbine 148 to compress the working fluid flowing therethrough to increase the pressure and thermal energy or heat (e.g., heat of compression) of the working fluid.

The turbine 148 may be fluidly coupled with and disposed downstream from the third heat exchanger 118 of the thermal storage assembly 106 via line 174, and may further be fluidly coupled with and disposed upstream of the fourth heat exchanger 120 of the thermal storage assembly 106 via line 176. The turbine 148 may be configured to receive the working fluid from the third heat exchanger 118 via line 174, expand the working fluid, and direct the expanded working fluid to the fourth heat exchanger 120 via line 176. The expansion of the working fluid through the turbine 148 may produce mechanical energy. For example, the turbine 148 may be configured to convert a pressure drop from the expansion of the working fluid to mechanical energy. At least a portion of the mechanical energy produced by the turbine 148 may be utilized to drive the compressor 150 and/or the generator 168.

As further described herein, the charging assembly 102 may be configured to store electrical energy in the form of heat or thermal energy, and the discharging assembly 104 may be configured to extract and convert the thermal energy to electrical energy. In at least one embodiment, the charging assembly 102 and the discharging assembly 104 may be operated in conjunction or concurrently with one another. In another embodiment, the charging assembly 102 and the discharging assembly 104 may be operated separately or in sequence with one another.

In an exemplary operation of the charging assembly 102, the working fluid (e.g., argon) maintained at or near ambient temperature may be directed to the compressor 140. The motor 144 may utilize electrical energy to drive the compressor 140. The compressor 140 may compress the working fluid to generate thermal energy (e.g., heat of compression), thereby increasing the temperature and pressure of the working fluid. The compressed working fluid may be directed from the compressor 140 to the first heat exchanger 114 via line 162. The particulate media maintained at or near ambient temperature may be directed from the ambient media tank 112 to the hot media tank 108 via conveyor 152 and the first heat exchanger 114. The first heat exchanger 114 may transfer thermal energy from the compressed working fluid to the particulate media flowing therethrough to thereby cool the working fluid and heat the particulate media. The heated particulate media may retain the thermal energy and be stored in the hot media tank 108. The compressed, cooled working fluid discharged from the first heat exchanger 114 may be directed to the turbine 142 via line 164. The turbine 142 may expand the working fluid to thereby decrease the temperature and the pressure of the working fluid flowing therethrough. The expanded working fluid may be directed from the turbine 142 to the second heat exchanger 116 via line 166. Particulate media maintained at or near ambient temperature may be directed from the ambient media tank 112 to the cold media tank 110 via conveyor 156 and the second heat exchanger 116. The second heat exchanger 116 may transfer thermal energy from the particulate media to the working fluid flowing therethrough to thereby heat the working fluid to ambient or near ambient temperature, and cool the particulate media. The cooled particulate media may be stored in the cold media tank 110, and the working fluid discharged from the second heat exchanger 116 may be directed to the compressor 140.

In an exemplary operation of the discharging assembly 104, compressed working fluid maintained at or near ambient temperature may be discharged from the compressor 150 and directed to the third heat exchanger 118 via line 172. The heated particulate media contained in the hot media tank 108 may be directed to the ambient media tank 112 via conveyor 154 and the third heat exchanger 118. The third heat exchanger 118 may transfer thermal energy from the heated particulate media to the compressed working fluid flowing therethrough to thereby cool the particulate media to ambient or near ambient temperature and heat the compressed working fluid. The particulate media at or near ambient temperature may be stored in the ambient media tank 112, and the heated, compressed working fluid from the third heat exchanger 118 may be directed to the turbine 148 via line 174. The turbine 148 may expand the heated, compressed working fluid to thereby decrease the temperature and pressure thereof. The expansion of the heated, compressed working fluid through the turbine 148 may produce mechanical energy, which may be utilized to generate electrical energy in the generator 168. In at least one embodiment, the expanded working fluid in line 176 may be at or near ambient temperature. In another embodiment, the expanded working fluid in line 176 may be greater than ambient temperature. The expanded working fluid in line 176 may be directed to the fourth heat exchanger 120 to heat the particulate media flowing therethrough. For example, during operation of the discharging assembly 104, the cooled particulate media contained in the cold media tank 110 may be directed to the ambient media tank 112 via conveyor 158 and the fourth heat exchanger 120. The fourth heat exchanger 120 may transfer thermal energy from the expanded working fluid in line 176 to the cooled particulate media to thereby heat the particulate media toward ambient temperature and cool the expanded working fluid.

In at least one embodiment, the particulate media from the fourth heat exchanger 120 may be at or near ambient temperature. In another embodiment, the particulate media may have a temperature greater than ambient temperature. Accordingly, the heat rejection system 130 may be utilized to remove additional thermal energy from the particulate media to cool the particulate media to a temperature at or near ambient temperature. For example, the pump 136 may flow a cooling fluid (e.g., air, sea water, water, etc.) to and through the heat exchanger 132 to remove the thermal energy from the particulate media flowing therethrough, thereby cooling the particulate media to ambient temperature. The cooling fluid containing the thermal energy from the heat exchanger 132 may then be directed to the cooling tower 134 where the thermal energy may be rejected from the PHES system 100.

Figure 2:
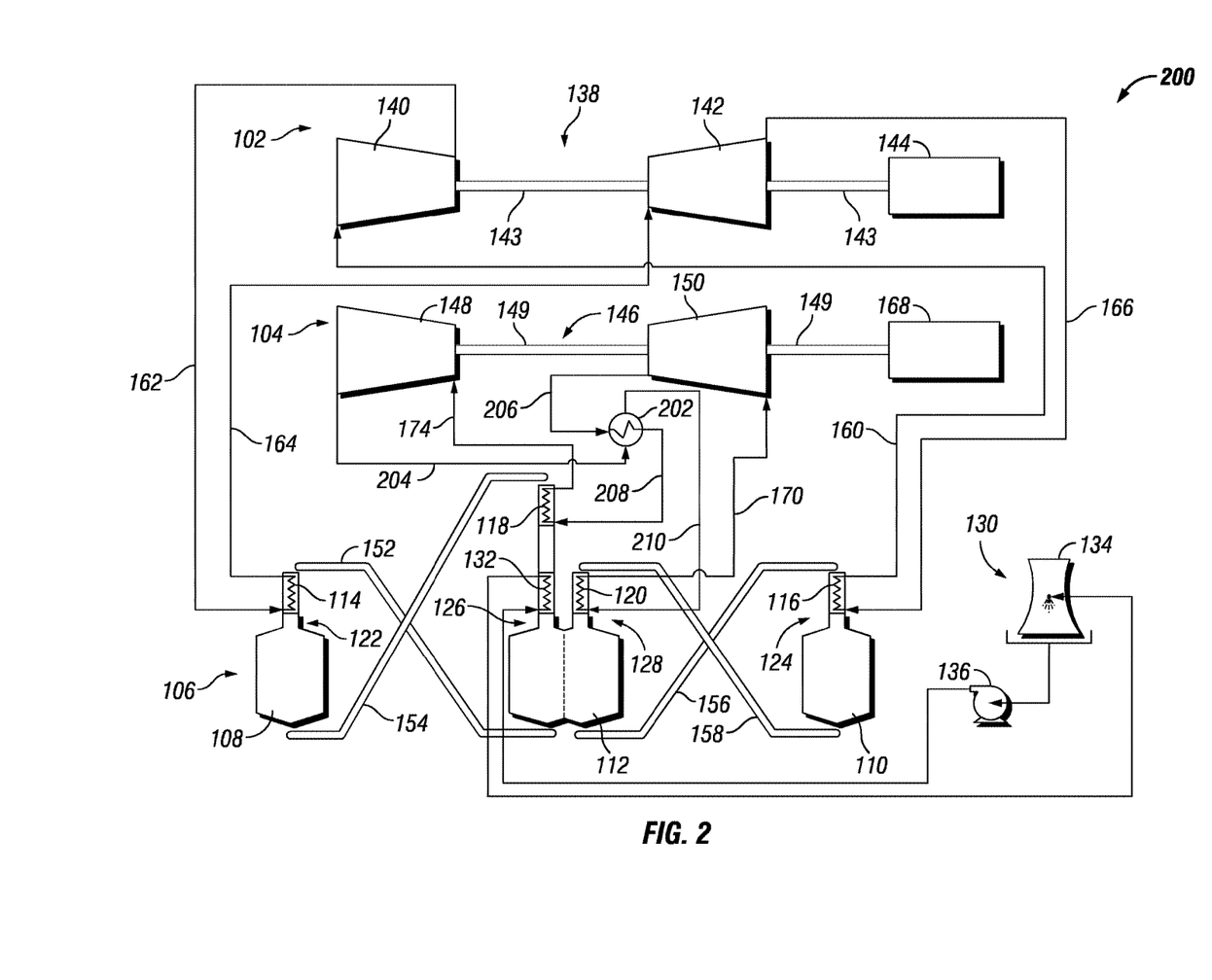
FIG. 2 illustrates a process flow diagram of another exemplary PHES system, according to one or more embodiments disclosed.

FIG. 2 illustrates a process flow diagram of another exemplary PHES system 200, according to one or more embodiments. The PHES system 200 may be similar in some respects to the PHES system 100 described above and therefore may be best understood with reference to the description of FIG. 1 where like numerals designate like components and will not be described again in detail. As illustrated in FIG. 2, the PHES system 200 may include a recuperator 202 configured to recover thermal energy (e.g., waste heat) from one or more portions of the PHES system 200. The recuperator 202 may be fluidly coupled with and disposed downstream from the turbine 148 and the compressor 150 via line 204 and line 206, respectively. The recuperator 202 may also be fluidly coupled with and disposed upstream of the third heat exchanger 118 and the fourth heat exchanger 120 via line 208 and line 210, respectively. As further illustrated in FIG. 2, the heat exchanger 132 of the heat rejection system 130 may be fluidly coupled with the first inlet 126 of the ambient media tank 112.

In an exemplary operation of the discharging assembly 104 of the PHES system 200, compressed working fluid may be discharged from the compressor 150 and directed to the third heat exchanger 118 via the recuperator 202 and lines 206, 208. The heated particulate media contained in the hot media tank 108 may be directed to the ambient media tank 112 via conveyor 154 and the third heat exchanger 118. The third heat exchanger 118 may transfer thermal energy from the heated particulate media to the compressed working fluid flowing therethrough to thereby cool the particulate media to ambient or near ambient temperature and heat the compressed working fluid. In at least one embodiment, the particulate media may be cooled to a temperature higher than ambient temperature. Accordingly, the heat exchanger 132 of the heat rejection system 130 may transfer additional thermal energy from the particulate media to the cooling fluid flowing therethrough, and the additional thermal energy may be rejected from the PHES system 200 via the cooling tower 134. The particulate media at or near ambient temperature may be stored in the ambient media tank 112, and the heated, compressed working fluid from the third heat exchanger 118 may be directed to the turbine 148 via line 174.

The turbine 148 may expand the heated, compressed working fluid to thereby decrease the temperature and pressure thereof. The expansion of the heated, compressed working fluid through the turbine 148 may produce mechanical energy, which may be utilized to generate electrical energy in the generator 168. In at least one embodiment, the expanded working fluid in line 204 may be at ambient temperature. In another embodiment, the expanded working fluid in line 204 may be greater than ambient temperature. In yet another embodiment, the expanded working fluid in line 204 may be below ambient temperature. The expanded working fluid in line 204 may be directed to the fourth heat exchanger 120 via the recuperator 202 and line 210. The recuperator 202 may transfer at least a portion of thermal energy between the working fluid flowing to the third heat exchanger 118 and the working fluid flowing to the fourth heat exchanger 120. The working fluid directed to the fourth heat exchanger 120 may heat the particulate media flowing therethrough. For example, the cooled particulate media contained in the cold media tank 110 may be directed to the ambient media tank 112 via conveyor 158 and the fourth heat exchanger 120. The fourth heat exchanger 120 may transfer thermal energy from the expanded working fluid in line 210 to the cooled particulate media to thereby heat the particulate media to at or near ambient temperature and cool the expanded working fluid.

As previously discussed, each of the charging assembly 102 and/or the discharging assembly 104 may be closed circuits or systems. As such, a mass or inventory of the working fluid and/or a base pressure of the working fluid contained in each of the charging assembly 102 and/or the discharging assembly 104 may remain the same. Accordingly, the power consumed in the charging assembly 102 and the power generated or produced in the discharging assembly 104 may not be changed. In at least one embodiment, illustrated in FIG. 3, the PHES systems 100, 200 discussed above may include an inventory system 300 configured to add and/or remove at least a portion of the working fluid circulating in the charging assembly 102 and/or the discharging assembly 104. It should be appreciated that removing a mass or portion of the working fluid from the charging assembly 102 and/or the discharging assembly 104 may decrease the base pressure thereof, thereby decreasing the power consumed and generated therein. It should also be appreciated that adding a mass or portion of the working fluid from the charging assembly 102 and/or the discharging assembly 104 may increase the base pressure thereof, thereby increasing the power consumed and generated therein. Therefore, by controlling the base pressure of the charging assembly 102 or discharging assembly 104, the rate at which energy is consumed or generated respectively is controlled in direct proportion.

Figure 3:
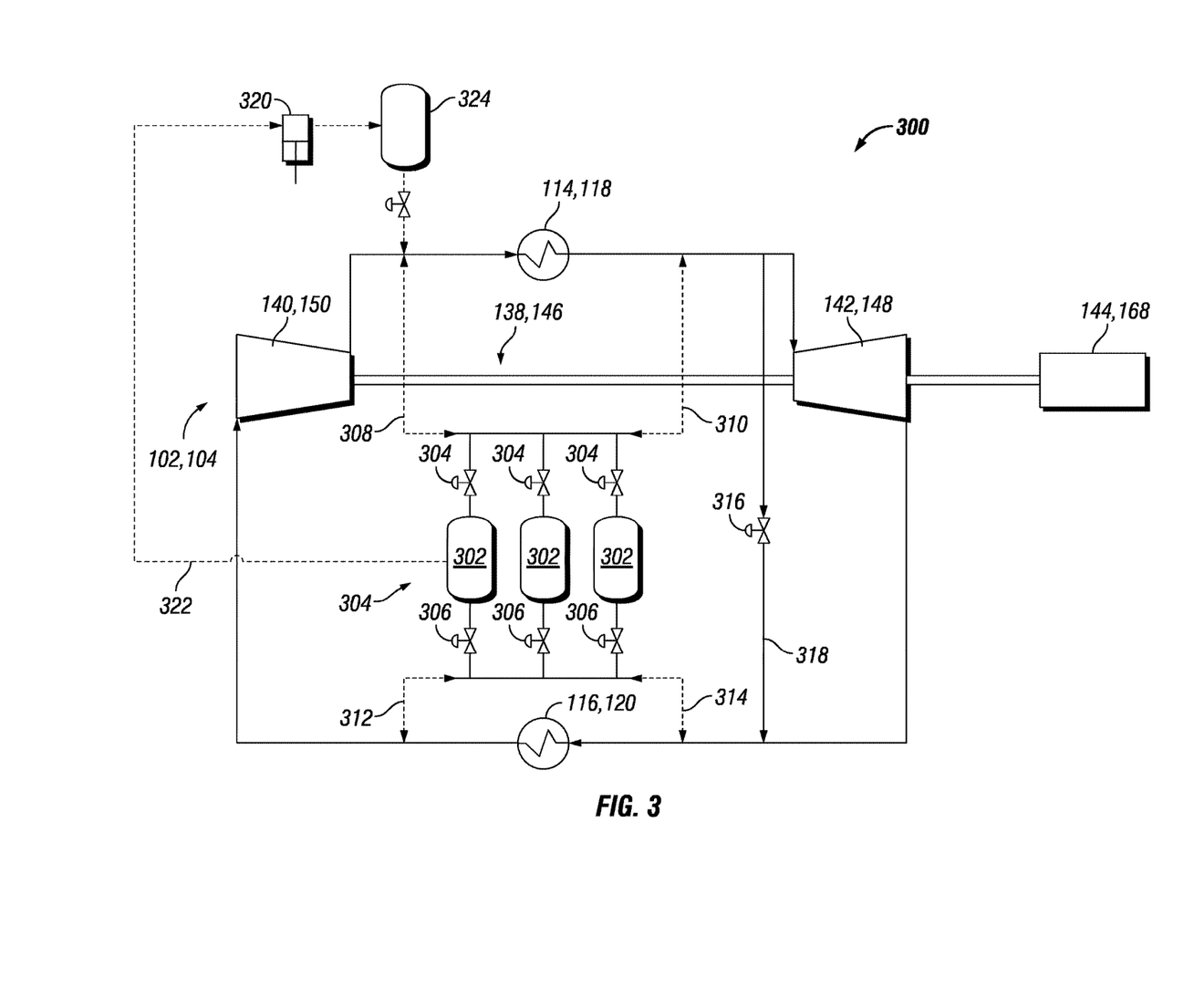
FIG. 3 illustrates a process flow diagram of an exemplary inventory system that may be utilized in the PHES systems described herein, accordingly to one or more embodiments disclosed.

As illustrated in FIG. 3, the inventory system 300 may include one or more tanks or accumulators (three are shown 302) and one or more valves (six are shown 304, 306) operably coupled with each of the accumulators 302. As further illustrated in FIG. 3, the valves 304 may be actuated to remove working fluid from the charging assembly 102 and/or the discharging assembly 104 via lines 310 and 308, respectively. For example, the working fluid may be removed from the discharging assembly 104 downstream of the compressor 150 and upstream of the heat exchanger 118 thereof via line 308. The working fluid may also be removed from the charging assembly 102 downstream of the heat exchanger 114 and upstream of the turbine 142 thereof via line 310.

The valves 306 may be actuated to add working fluid to the charging assembly 102 and/or the discharging assembly 104 from the accumulators 302 via lines 312 and 314. For example, the working fluid may be added to the charging assembly 102 and/or the discharging assembly 104 downstream of the respective heat exchanger 116, 120 and upstream of the respective compressor 140, 150 thereof via line 312. The working fluid may also be added to the charging assembly 102 and/or the discharging assembly 104 upstream of the respective heat exchanger 116, 120 and downstream of the respective turbine 142, 148 thereof via line 314.

In at least one embodiment, the inventory system 300 may be configured to add or remove the working fluid having a temperature at or near ambient temperature. For example, the inventory system 300 may be configured to remove at least a portion of the working fluid flowing through line 172 (see FIG. 1) downstream of the compressor 150 and upstream of the third heat exchanger 118. In another example, the inventory system 300 may be configured to remove at least a portion of the working fluid flowing through line 160 (see FIG. 1) downstream of the second heat exchanger 116 and upstream of the compressor 140. In another embodiment, the inventory system 300 may remove working fluid from the charging assembly 102 and/or the discharging assembly 104 having a temperature greater than ambient temperature. In such an embodiment, the working fluid may be cooled to ambient temperature in one or more heat exchangers (not shown) before being stored in the accumulators 302.

In at least one embodiment, the inventory system 300 illustrated in FIG. 3 may be operated passively. For example, any one or more of the valves 304, 306 may be actuated to passively remove high pressure working fluid from the charging assembly 102 and/or the discharging assembly 104 and direct the high pressure working fluid to the accumulators 302. In another example, any one or more of the valves 304, 306 may be actuated to passively add high pressure working fluid from accumulators 302 and direct the high pressure working fluid to the charging assembly 102 and/or the discharging assembly 104. In another embodiment, the inventory system 300 illustrated in FIG. 3 may be actively operated. For example, at least a portion of the working fluid contained in the accumulator 302 may be directed to a compressor 320 via line 322 and compressed therein. The compressor 320 may compress the working fluid to a pressure greater than a pressure of the working fluid discharged from the compressor 140, 150. The compressed working fluid from the compressor 320 may then be directed to and stored in another vessel or accumulator 324. During one or more modes of operating the PHES systems 100, 200, the working fluid stored in the accumulator 324 may be injected into the charging assembly 102 and/or the discharging assembly 104 downstream of the respective compressor 140, 150 thereof. The injection of the working fluid into the charging assembly 102 and/or the discharging assembly 104 may improve transient performance during increased output from the charging assembly 102 and/or the discharging assembly 104. As illustrated in FIG. 3, the inventory system 300 may also include a bypass valve 316 and bypass line 318 configured to rapidly reduce a load of the charging assembly 102 and/or reduce the output of the discharging assembly 104.

As previously discussed, the inventory system 300 may include one or more of the accumulators 302. It should be appreciated that each of the accumulators 302 may maintain the working fluid at the same pressure or at varying pressures. Maintaining the working fluid in each of the accumulators 302 at varying pressures may allow the PHES systems 100, 200 to operate over a broad range of base pressures, thereby allowing the PHES systems 100, 200 to consume and generate varying amounts of power. As further discussed above, the pressure of the working fluid contained in the charging assembly 102 and/or the discharging assembly 104 may be different than the pressure of the thermal storage assembly 106. Accordingly, the base pressure of the charging assembly 102 and/or the discharging assembly 104 may be increased or decreased without correspondingly increasing or decreasing the pressure of the thermal storage assembly 106.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A pumped heat energy storage system, comprising:
a charging assembly configured to compress a working fluid and generate thermal energy;
a thermal storage assembly operably coupled with the charging assembly and configured to store the thermal energy generated from the charging assembly,
wherein the thermal storage assembly comprises:
a first media tank operably coupled with the charging assembly;
a first heat exchanger coupled with an inlet of the first media tank;
a second media tank operably coupled with the charging assembly;
a second heat exchanger coupled with an inlet of the second media tank;
a third media tank fluidly coupled with the first media tank and the second media tank;
a third heat exchanger coupled with a first inlet of the third media tank; and
a fourth heat exchanger coupled with a second inlet of the third media tank;
a discharging assembly operably coupled with the thermal storage assembly and configured to extract the thermal energy from the thermal storage assembly and convert the thermal energy to electrical energy,
wherein the charging assembly comprises:
a compressor fluidly coupled with and disposed upstream of the first heat exchanger and downstream of the second heat exchanger, the compressor of the charging assembly being configured to compress the working fluid and generate the thermal energy;
a turbine fluidly coupled with and disposed downstream from the first heat exchanger and upstream of the second heat exchanger; and
a motor coupled with the compressor of the charging assembly and configured to drive the compressor of the charging assembly; and
an inventory system fluidly coupled with the charging assembly and configured to add and/or remove at least a portion of the working fluid flowing through the charging assembly, wherein the inventory system comprises one or more tanks and one or more valves operably coupled with each of the tanks,
wherein working fluid can be removed from the charging assembly downstream of the first heat exchanger and upstream of the turbine of the charging assembly via a first line.

2. The pumped heat energy storage system of claim 1, wherein the inventory system is further fluidly coupled with the discharging assembly and configured to add and/or remove at least another portion of the working fluid flowing through the discharging assembly,
wherein the discharging assembly comprises:
a compressor fluidly coupled with and disposed downstream from the fourth heat exchanger and upstream of the third heat exchanger, the compressor of the discharging assembly being configured to compress the working fluid from the fourth heat exchanger;
a turbine fluidly coupled with and disposed downstream from the third heat exchanger and upstream of the fourth heat exchanger, the turbine of the discharging assembly configured to expand the working fluid from the third heat exchanger to generate mechanical energy; and
a generator operably coupled with the turbine of the discharging assembly and configured to convert at least a portion of the mechanical energy to the electrical energy,
wherein working fluid can be removed from the discharging assembly downstream of the compressor of the discharging assembly and upstream of the second heat exchanger via a second line.

3. The pumped heat energy storage system of claim 1, further comprising a heat rejection system, the heat rejection system comprising:
a fifth heat exchanger operably coupled with the second inlet of the third media tank;
a pump fluidly coupled with and disposed upstream of the fifth heat exchanger, the pump being configured to circulate a cooling fluid to the fifth heat exchanger; and
a cooling unit fluidly coupled with and disposed downstream from the fifth heat exchanger and upstream of the pump.

4. The pumped heat energy storage system of claim 1, further comprising a heat rejection system, the heat rejection system comprising:
a fifth heat exchanger operably coupled with the first inlet of the third media tank;
a pump fluidly coupled with and disposed upstream of the fifth heat exchanger, the pump being configured to circulate a cooling fluid to the fifth heat exchanger;
a cooling unit fluidly coupled with and disposed downstream from the fifth heat exchanger and upstream of the pump; and
a recuperator fluidly coupled with and disposed downstream of a turbine and a compressor of the discharging assembly and upstream of the third and fourth heat exchangers.

5. A pumped heat energy storage system, comprising:
a charging assembly configured to generate thermal energy, the charging assembly comprising:
a first compressor configured to compress a working fluid to generate the thermal energy;
a first turbine operably coupled with the first compressor; and
a motor coupled with the first compressor and configured to drive the first compressor;
a thermal storage assembly operably coupled with the charging assembly and configured to store the thermal energy generated from the charging assembly; and
a discharging assembly operably coupled with the thermal storage assembly and configured to extract the thermal energy from the thermal storage assembly and convert the thermal energy to electrical energy, the discharging assembly comprising:
a second compressor configured to compress the working fluid from the thermal storage assembly;
a second turbine operably coupled with the second compressor and configured to expand the working fluid from the thermal storage assembly to generate mechanical energy; and
a generator operably coupled with the second turbine and configured to convert at least a portion of the mechanical energy to the electrical energy; and
an inventory system operably and fluidly coupled with the charging assembly and configured to add and/or remove at least a portion of the working fluid flowing through the charging assembly;
wherein the inventory system comprises:
a first tank fluidly coupled with and disposed downstream from the first compressor and upstream of the first turbine; and
a valve fluidly coupled with the first tank and configured to control a flow of the portion of the working fluid to the first tank;
wherein the inventory system is further operably and fluidly coupled with the discharging assembly and is configured to be actively operated to add and/or remove at least another portion of the working fluid flowing through the discharging assembly,
wherein the inventory system further comprises:
a second tank fluidly coupled with and disposed downstream from the second compressor and upstream of the second turbine;
a valve fluidly coupled with the second tank and configured to control a flow of the portion of the working fluid to the second tank;
a third compressor fluidly coupled with and disposed downstream from the first tank; and
a third tank fluidly coupled with and disposed downstream from the third compressor, the third tank configured to store compressed working fluid from the third compressor and inject the compressed working fluid into the discharging assembly downstream of the second compressor.

6. The pumped heat energy storage system of claim 5, wherein the thermal storage assembly comprises:
a first media tank thermally coupled with the first compressor;
a first heat exchanger coupled with an inlet of the first media tank and fluidly coupled with and disposed downstream from the first compressor;
a second media tank operably coupled with the first turbine;
a second heat exchanger coupled with an inlet of the second media tank and fluidly coupled with and disposed downstream from the first turbine.

7. The pumped heat energy storage system of claim 6, wherein the thermal storage assembly further comprises:
a third media tank fluidly coupled with the first media tank and the second media tank;
a third heat exchanger coupled with a first inlet of the third media tank and fluidly coupled with and disposed downstream from the second compressor; and
a fourth heat exchanger coupled with a second inlet of the third media tank and fluidly coupled with and disposed downstream from the second turbine.

8. The pumped heat energy storage system of claim 7, wherein the thermal storage assembly is configured to circulate a particulate media through the first media tank, the second media tank, and the third media tank via a series of conveyors.

9. The pumped heat energy storage system of claim 7, wherein each of the first heat exchanger, the second heat exchanger, the third heat exchanger, and the fourth heat exchanger is an indirect solid-gas heat exchanger.

10. The pumped heat energy storage system of claim 7, further comprising a heat rejection system, the heat rejection system comprising:
a fifth heat exchanger operably coupled with the second inlet of the third media tank;
a pump fluidly coupled with and disposed upstream of the fifth heat exchanger, the pump being configured to circulate a cooling fluid to the fifth heat exchanger; and a cooling unit fluidly coupled with and disposed downstream from the fifth heat exchanger and upstream of the pump.

11. The pumped heat energy storage system of claim 7, further comprising a heat rejection system, the heat rejection system comprising:
a fifth heat exchanger operably coupled with the first inlet of the third media tank;
a pump fluidly coupled with and disposed upstream of the fifth heat exchanger, the pump being configured to circulate a cooling fluid to the fifth heat exchanger;
a cooling unit fluidly coupled with and disposed downstream from the fifth heat exchanger and upstream of the pump; and
a recuperator fluidly coupled with and disposed downstream of the second turbine and the second compressor and upstream of the third and fourth heat exchangers.

12. A pumped heat energy storage system, comprising:
a thermal storage assembly configured to store thermal energy, the thermal storage assembly comprising:
a first media tank configured to store particulate media at ambient temperature;
a second media tank fluidly coupled with the first media tank and configured to store a heated particulate media;
a third media tank fluidly coupled with the first media tank and configured to store a cooled particulate media;
a first heat exchanger coupled with an inlet of the second media tank;
a second heat exchanger coupled with an inlet of the third media tank;
a third heat exchanger coupled with a first inlet of the first media tank; and
a fourth heat exchanger coupled with a second inlet of the first media tank,
wherein each of the first, second, third, and fourth heat exchangers is an indirect solid-gas heat exchanger;
a charging assembly configured to compress a working fluid and generate the thermal energy stored in the thermal storage assembly, the charging assembly comprising:
a first compressor fluidly coupled with and disposed upstream of the first heat exchanger and downstream of the second heat exchanger, the first compressor being configured to compress the working fluid and generate the thermal energy;
a first turbine fluidly coupled with and disposed downstream from the first heat exchanger and upstream of the second heat exchanger; and
a motor coupled with the first compressor and configured to drive the first compressor;
a discharging assembly configured to extract the thermal energy stored in the thermal storage assembly and convert the thermal energy to electrical energy, the discharging assembly comprising:
a second compressor fluidly coupled with and disposed downstream from the fourth heat exchanger and upstream of the third heat exchanger, the second compressor being configured to compress the working fluid from the fourth heat exchanger;
a second turbine fluidly coupled with and disposed downstream from the third heat exchanger and upstream of the fourth heat exchanger, the second turbine configured to expand the working fluid from the third heat exchanger to generate mechanical energy; and
a generator operably coupled with the second turbine and configured to convert at least a portion of the mechanical energy to the electrical energy.

* * * * *